United States Patent [19]

Yasuda et al.

[11] Patent Number: 4,782,369

[45] Date of Patent: Nov. 1, 1988

[54] DEVICE FOR ILLUMINATING AN ORIGINAL DOCUMENT

[75] Inventors: Yuji Yasuda; Yoshiyuki Tanimoto, both of Tokyo, Japan

[73] Assignee: Ricoh Company, Ltd., Tokyo, Japan

[21] Appl. No.: 116,683

[22] Filed: Nov. 4, 1987

[30] Foreign Application Priority Data

Nov. 4, 1986 [JP] Japan ................................ 61-262575
Nov. 12, 1986 [JP] Japan ................................ 61-268824

[51] Int. Cl.[4] ................................................ G03B 27/72

[52] U.S. Cl. ........................................ 355/69; 355/75; 355/120

[58] Field of Search .................. 355/3 FU, 69, 75, 76, 355/120, 133, 14 R, 67

[56] References Cited

U.S. PATENT DOCUMENTS

| | | | |
|---|---|---|---|
| 4,089,602 | 5/1978 | Noguchi et al. | 355/69 |
| 4,111,541 | 9/1978 | Townsend | 355/69 X |
| 4,146,822 | 3/1979 | Eppe et al. | 355/69 X |
| 4,183,654 | 1/1980 | Waschk et al. | 355/69 X |
| 4,272,183 | 6/1981 | Maese et al. | 355/14 R |
| 4,290,692 | 9/1981 | Svatek | 355/69 |
| 4,390,267 | 6/1983 | Minor | 355/75 X |
| 4,711,569 | 12/1987 | Nishimori et al. | 355/69 |

*Primary Examiner*—Richard A. Wintercorn
*Attorney, Agent, or Firm*—Oblon, Fisher, Spivak, McClelland & Maier

[57] ABSTRACT

A flash lamp type device for illuminating an original document insures safety operation by alerting an operator, by an alarm, display and others, to the breakage of a glass platen and/or the open position of a protective cover which may occur while the voltage charge in a capacitor is higher than any desired voltage. A trigger circuit associated with a trigger wire is disenabled by sensing the breakage of a glass platen and/or the open position of the protective cover.

5 Claims, 10 Drawing Sheets

DEVICE FOR ILLUMINATING AN ORIGINAL DOCUMENT

BACKGROUND OF THE INVENTION

The present invention relates to à flash lamp type device for illuminating an original document and, more particularly, to an original document illuminating device which for safety operation activates an alarm, a display and others by detecting the breakage of a glass platen and/or the open position of a protective cover and disenabling a trigger circuit which is associated with a trigger wire.

In electrophotographic equipment, a flash lamp type illuminating device usually includes a trigger wire which is provided around a flash lamp and applied with a predetermined high voltage to energize the flash lamp. To guarantee safety operation, that portion of the illuminating device in which the flash lamp is disposed is surrounded by a protective cover. In addition, when the protective cover is opened for the replacement of the flash lamp or maintenance, the power supply is automatically shut off by sensing the opening of the cover and/or by sensing the breakage of a glass platen so as to eliminate the fear of electric shock.

However, an illuminating device of the kind described further includes a main capacitor which is adapted to cause the flash lamp to glow and, for this purpose, charged with a high voltage. Even if the power supply to the interior of the device is stopped, there is a fear that a person touches the high-voltage section inside of the device to receive an electric shock when he or she opens the protective cover to replace the flash lamp or when the glass platen is broken.

In the light of the above, an arrangement may be made such that the open position of the protective cover occurring in the event of replacement of the lamp is sensed to automatically discharge the main capacitor and, thereby, cause the flash lamp to radiate. This kind of implementation against electric shocks is not fully acceptable, however, because a charged capacitor exists in a trigger circuit which is associated with the trigger wire. Specifically, a high voltage (13 to 10 kilovolts) is apt to be developed in the trigger wire due to malfunctions of the trigger circuit and/or those of a control section which are ascribable to, for example, noise introduced in a central processing unit (CPU) of a microcomputer. Consequently, when a person opens the cover to replace the lamp or when the glass platen is broken, he or she is not free from the fear of touching the trigger wire which would give an electric shock.

SUMMARY OF THE INVENTION

It is, therefore, an object of the present invention to provide an original document illuminating device capable of eliminating an electrical shock due to physical contact with a high-voltage section which will be exposed to the outside when a protective cover is opened for the replacement of a lamp and other purposes or when a glass platen is broken.

It is another object of the present invention to provide an original document illuminating device capable of eliminating an electrical shock due to contact with a trigger wire which will be exposed to the outside when a protective cover is opened for the replacement of a lamp and other purposes or when a glass platen is broken.

It is another object of the present invention to provide a generally improved device for illuminating an original document.

In accordance with the present invention, there is provided a device for illuminating an original document laid on a glass platen of a recording apparatus to expose a photoconductive element imagewise by using a flash lamp which is triggered by a trigger wire, comprising a protective cover for protecting the flash lamp, a trigger circuit for the trigger wire, and a control means for disenabling the trigger circuit when the glass platen is broken or when the protective cover is opened.

The above and other objects, features and advantages of the present invention will become more apparent from the following detailed description taken with the accompanying drawings.

DESCRIPTION OF THE PREFERRED EMBODIMENTS

Figure 1:
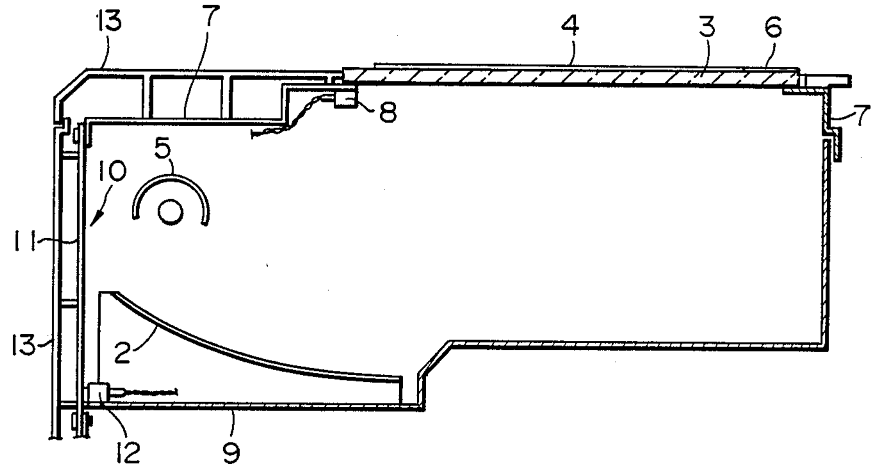
FIG. 1 is a section showing an illuminating device embodying the present invention.
Figure 2:
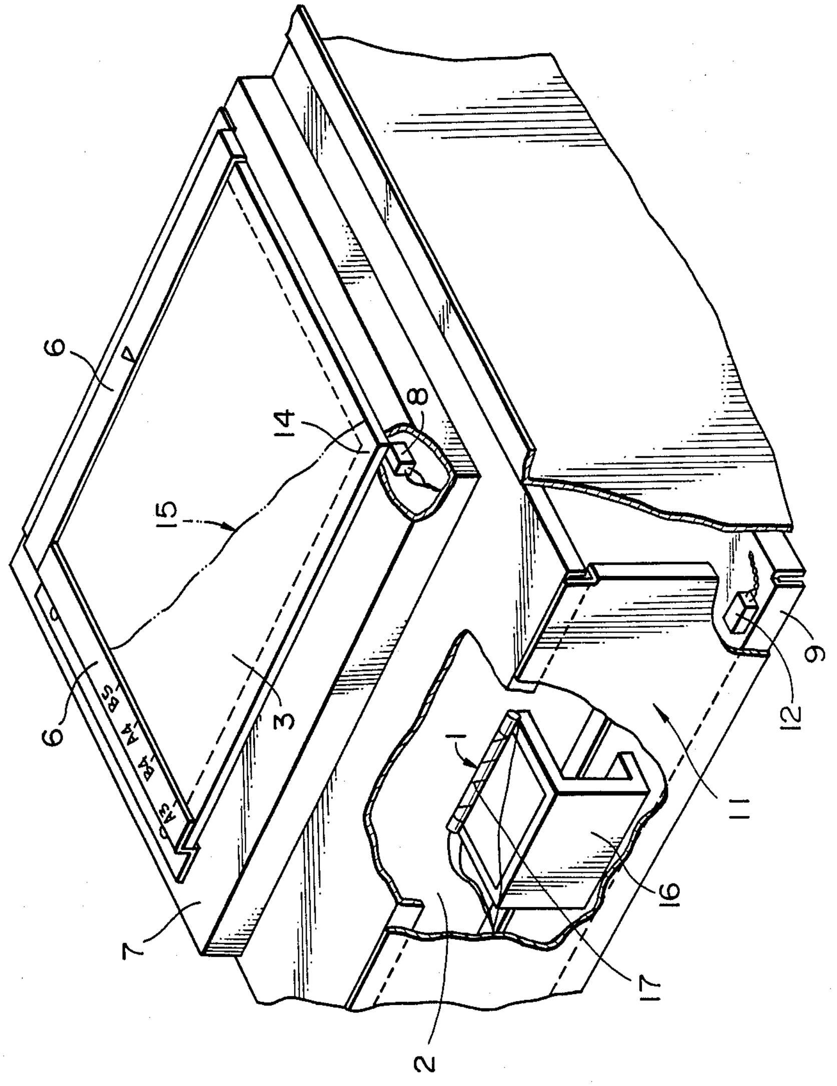
FIG. 2 is a partly taken away perspective view of the illuminating device as shown in FIG. 1.

Referring to FIGS. 1 and 2 of the drawings, an original document illuminating device embodying the present invention and which is applicable to an electrophotographic apparatus is shown. As shown, the illuminating device includes a flash lamp 1 for illuminating an original document 4. A mirror 2 is fixed to a lower base member 9 and disposed below the flash lamp 1 so as to redirect light issuing from the lamp 1 toward the document 4 by reflection, i.e., to prevent the light from directly illuminating the document 4. A shade 5 concentric with the lamp 1 is provided around the lamp 1 so that light issuing from the lamp 1 to the side opposite to the mirror 3 may be reflected toward the mirror 2. These structural elements serve to enhance efficient illumination. A glass platen 3 is fixed to an upper base member 7 by a fixing member 6. A switch 8 is also fixed to the upper base member 7 by a bracket or the like, not shown, and so adjusted in position as to constantly make contact with the underside of the glass platen 3, thereby constantly checking the glass platen 3 for breakage. An opening 10 is provided between the upper base member 7 and the lower base member 9 which supports the mirror 2, allowing an access to the interior of the device for the replacement and inspection of the lamp and others. Usually, the opening 10 is closed by a protective cover 11. A switch 12 is fixed to the lower base member 9 to constantly monitor the open-close condition of the cover 11. Further, an outer cover 13 for protecting the entire apparatus is provided around the protective cover 11 and upper base member 7.

As shown in FIG. 2, the glass platen 3 is fixed at its two contiguous sides to the upper base member 7 by the fixing member 6. Various document sizes and indications representative of document loading positions are printed on the fixing member 6. The switch 8 responsive to the breakage of the glass platen 3 as previously stated is located below a corner portion 14 of the free end of the glass platen 3. The flash lamp 1 is retained by a lamp holder 16 which is in turn fixed to the lower base member 9. A trigger wire 17 is disposed around the lamp 1 to serve as a triggering means for triggering the emission from the lamp 1. The trigger unit 17 is connected to a trigger unit, not shown, with a power source drawn out from opposite ends of the lamp 1. Since the trigger wire 17 is implemented with a nickel wire and naked over its metal portion and since a high voltage is applied to the trigger wire 17 in the event of turn-on of the lamp 1, the protective cover 11 is provided for eliminating the fear of an electric shock.

Figure 3A:
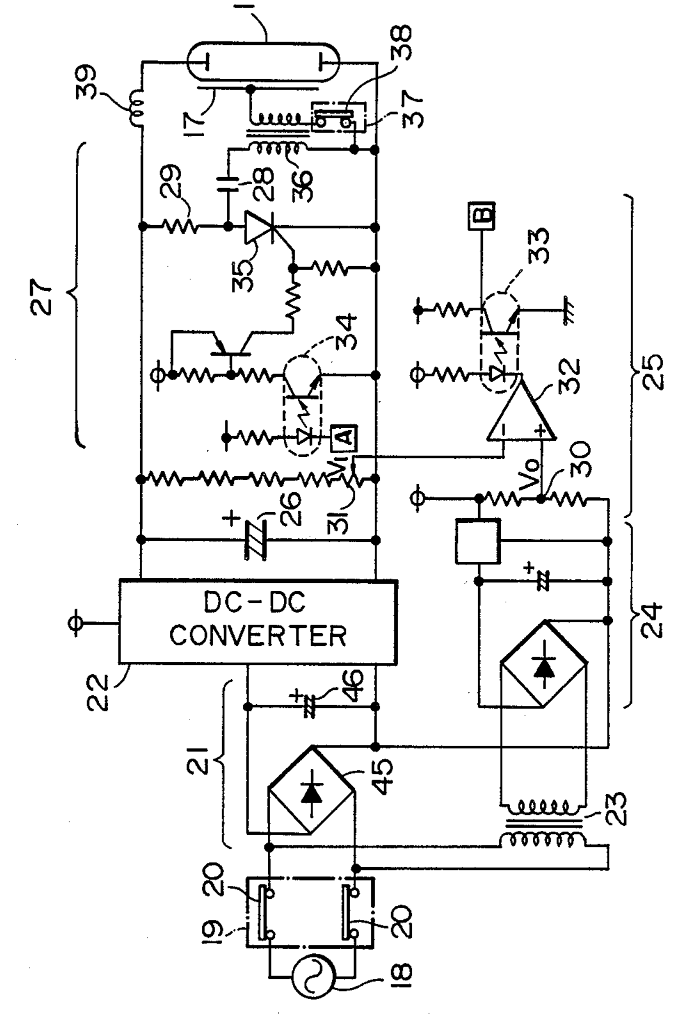
FIGS. 3A and 3B are schematic block diagrams showing a specific construction of a control circuit in accordance with the present invention.
Figure 3B:
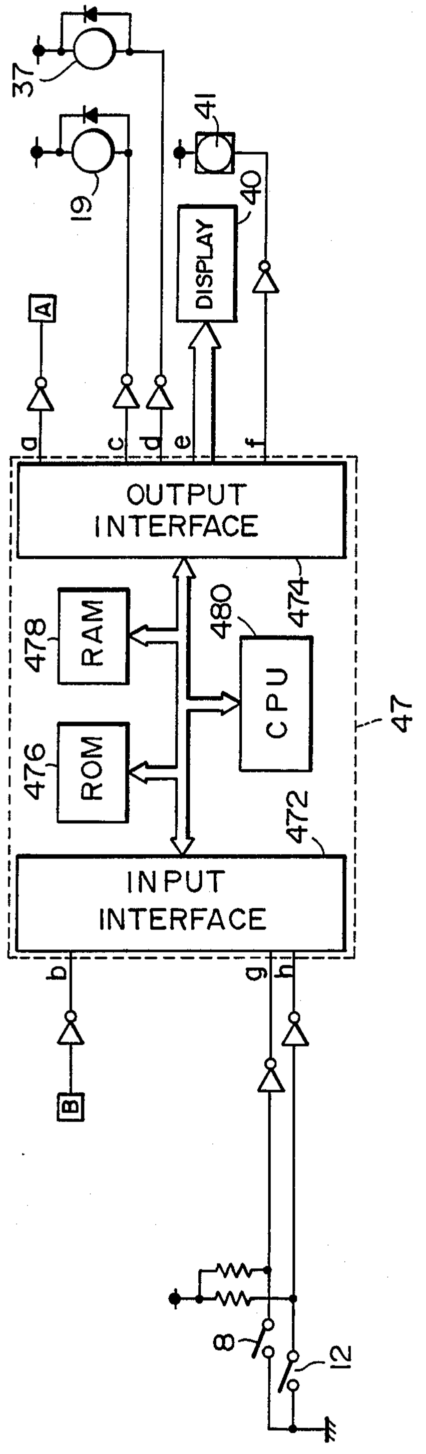

Referring to FIGS. 3A and 3B, a specific construction of a control circuit in accordance with the present invention is shown. As shown in FIG. 3A, the control circuit includes a power source 18 for applying drive energy to the interior of the device, and a relay 19 having two normally closed contacts 20 and adapted to electrically disconnect the apparatus from the power source 18. The control circuit further includes a rectifier and smoother circuit 21 which is made up of a rectifier 45 and a capacitor 46 for removing pulsations from an output voltage waveform of the rectifier 45, and a DC—DC converter 22 which serves as a power converter for converting a DC input voltage into a desired DC voltage. A main capacitor 26 is connected to the DC—DC converter 22 while a trigger circuit section 27 is connected to the main capacitor 26. The trigger circuit section 27 comprises a trigger capacitor 28, a resistor 29 having high resistance and adapted to controllably charge the trigger capacitor 28, a photocoupler 34 operable in response to a control signal a which is generated by a controller 47, FIG. 3B, and a thyristor 35 selectively turned on by the photocoupler 34. A trigger transformer 36 is provided for generating a high-voltage pulse based on the charge which is stored in the trigger capacitor 28. A relay 37 having a normally closed contact 38 is connected to the secondary winding of the trigger transformer 36. A winding 39 is connected between the main capacitor 26 and the lamp 1 in order to control the discharge time of the lamp 1.

On the other hand, the power from the relay 19 is transformed by a transformer 23 and, then, applied to a charged voltage detector section 25 via a rectifier and smoother circuit 24, which is similar to the previously mentioned circuit 21. The charged voltage detector section 25 includes a comparator 32 to which are applied a reference voltage Vo appearing on a junction 30 and a charge detection voltage Vi produced by a variable resistor 31 by dividing an output voltage of the main capacitor 26. A photocoupler 33 is adapted to deliver a detection signal to the controller 47. As shown in FIG. 3B, the controller 47 includes an input interface 472 to which are applied a charge detection signal b from the charged voltage detector section 25, an output signal g of the switch 8 responsive to the breakage of the glass platen 3, and an output signal h of the switch 12 responsive to the open-close condition of the protective cover 11. The controller further includes an output interface 474 for delivering the trigger signal a, relay signals c and d, a display signal e, and an alarm signal f, a read-only memory (ROM) 476, a random access memory (RAM) 478, and a CPU 480. The reference numeral 40 designates a display section for indicating "DANGER" and "CAUTION" by flashing and others, and 41 a buzzer for producing an audible alarm.

In operation, the power source is usually connected to the normally closed contacts 20 of the relay 19 and, therefore, fed to the DC—DC converter 22 via the rectifier and smoother circuit 21. At the same time, the power source is applied to the charged voltage detector section 25 by way of the transformer 23 and rectifier and smoother circuit 24.

In the event when the device is driven, the main capacitor 26 is charged to several hundreds of volts by the DC—DC converter 22 in response to a charge start signal which is output by the controller 47. Simultaneously, the trigger capacitor 28 of the trigger circuit section 27 is charged through the resistor 29. In the charged voltage detector section 25, when the charge detection voltage Vi exceeds the reference voltage Vo, the comparator 32 activates the photocoupler 33. As a result, a detection signal is fed from the photocoupler 33 to the controller 47 informing the latter of the increase of the charge beyond a desired value. Then, the apparatus becomes ready to copy and waits until a copy command arrives thereat. As the controller 47 delivers the trigger signal a at a desired timing after the charging, the photocoupler 34 of the trigger circuit 27 is activated to turn on the thyristor 35. In response, the charge of the trigger capacitor 28 generates a high-voltage pulse in on the secondary winding side of the trigger transformer 36 through the primary winding side, whereby the flash lamp 1 is triggered and the main capacitor 26 is discharged. As a result, the lamp 1 is caused to emit light.

Figure 4:
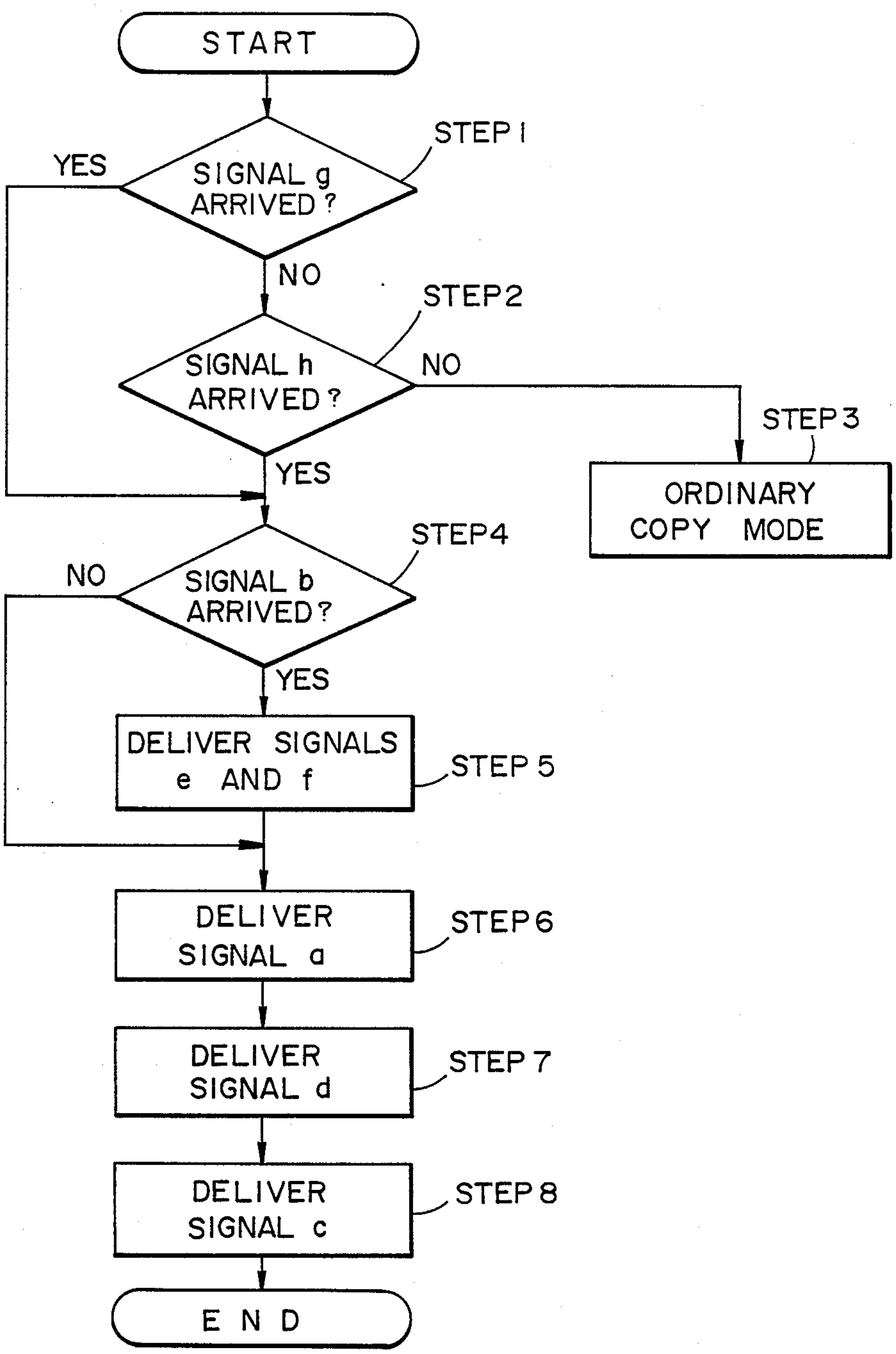
FIG. 4 is a flowchart demonstrating the operation of the control circuit as shown in FIGS. 3A and 3B.

A reference will be made to FIG. 4 for describing a sequence of steps which occur when the glass platen 3 is broken and/or when the protective cover 11 is opened.

So long as the contact glass 3 is present and the protective cover 11 is closed, none of the switches 8 and 12 delivers a detection signal to the controller 47. When the glass platen 3 is broken by an accident and/or when the cover 11 is opened for the replacement of the flash lamp 1 and others purposes, the switch 8 applies a detection signal g (representative of the breakage of the glass platen 3) to the controller 47 and/or the switch 12 applies a detection signal h (representative of the open position of the cover 11) to the controller 47, steps 1 and 2. While this kind of detection signal is not fed to the controller 47, an ordinary copy mode is set up in which the apparatus waits for a copy command, step 3.

When the detection signal g and/or the detection signal h has arrived at the controller 47 together with a signal b (charge detection signal), step 4, the controller 47 delivers a display control signal e to the display section 40 and an alarm control signal f to the buzzer 41. In response, the display section 40 displays "DANGER" and "CAUTION" while, at the same time, the buzzer 41 produced an audible alarm, step 5.

Why the control signals e and f output conditions include the entry of the signal b is as follows. Since the reference voltage Vo applied to the comparator 32 is selected such that the charge stored in the main capacitor 26 does not cause an electric shock and other undesirable occurrences, a situation wherein the charge detection signal b does not appear would be harmless. If desired, however, the control signals e and f may be produced even if the charge detection signal is absent, alerting the operator to the breakage of the glass platen 3 and the open position of the protective cover 11.

When the controller 47 produces a trigger signal a at any desired timing, the photocoupler 34 of the trigger circuit 27 and, therefore, the thyristor 35 is turned on. In this condition, the charge of the trigger capacitor 28 causes a high-voltage pulse to appear on the secondary winding side of the trigger transformer 36 via the primary winding side. Then, the lamp 2 is triggered and the main capacitor 26 is discharged, resulting that the lamp 2 glows, step 6. Thereafter, the controller 47 delivers a relay signal d at any desired timing, step 7, to energize the relay 37, whereby the normally closed contact 38 of the relay 37 is opened to turn off the secondary winding of the trigger transformer 36. This prevents a high voltage from being developed in the trigger wire 17 despite any malfunction of the trigger circuit 27, thereby ensuring safety operation. Further, the controller 47 outputs a relay signal c at a suitable timing, step 8, to energize the relay 19, resulting that the normally closed contacts 20 of the relay 19 are opened to interrupt the power supply from the power source 18 to the equipment.

Figure 5A:
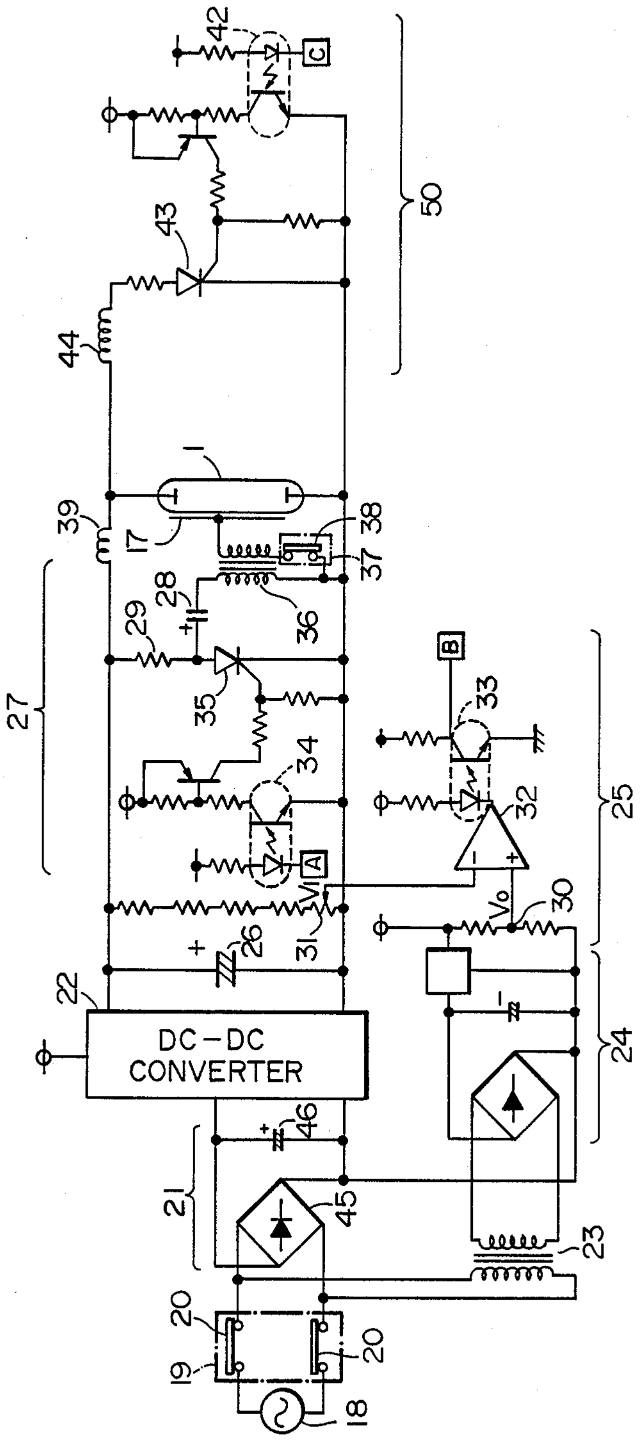
FIGS. 5A and 5B are schematic block diagrams showing a modification to the control circuit as shown in FIGS. 3A and 3B.
Figure 5B:
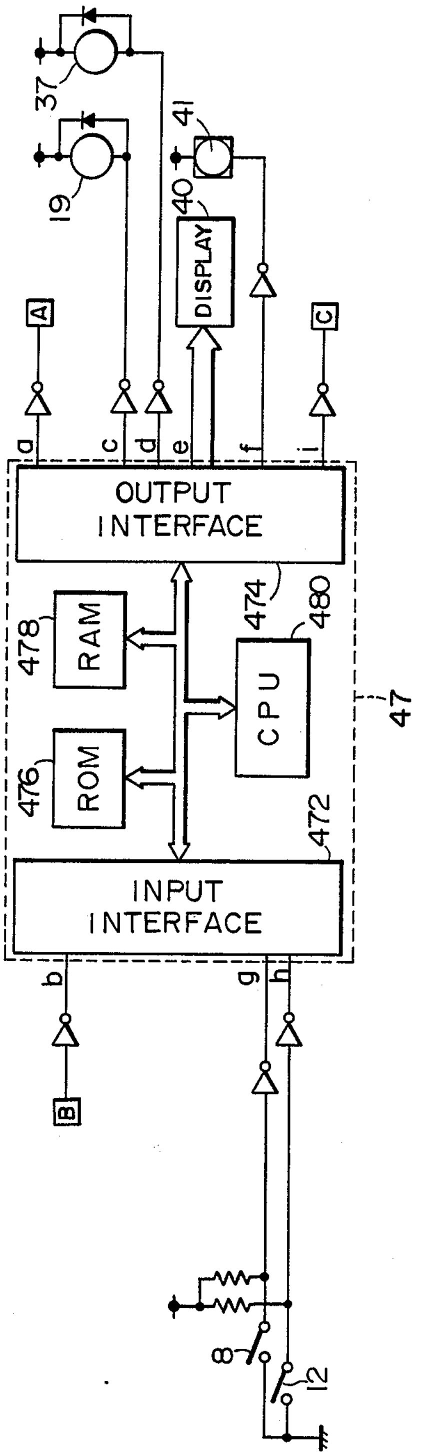

Referring to FIGS. 5A and 5B, a modification to the control circuit of FIGS. 3A and 3B is shown. In these figures, the same structural elements as those shown in FIGS. 3A and 3B are designated by like reference numerals, and detailed description thereof will be omitted for avoiding redundancy. The control circuit of FIGS. 5A and 5B additionally includes a main capacitor discharging circuit 50 which is made up of a photocoupler 42 responsive to a control signal i from the controller 47, a thyristor 43 responsive to the operation of the photocoupler 42, and a winding 44 for controlling the discharge time of the main capacitor 26.

Figure 6:
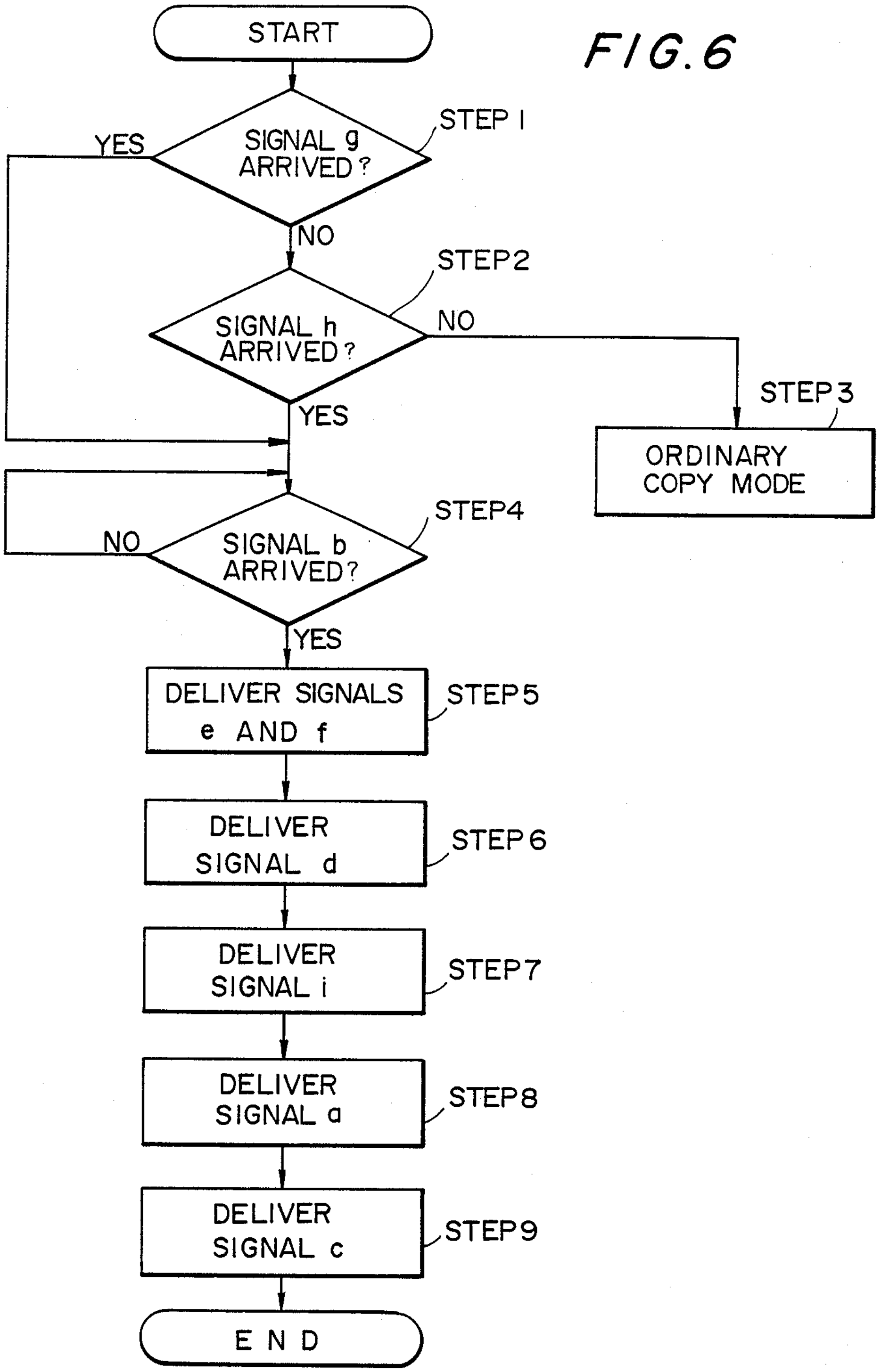
FIG. 6 is a flowchart demonstrating the operation of the control circuit as shown in FIGS. 5A and 5B.

A reference will be made to FIG. 6 for describing an operation which occurs when the glass plate 3 is broken and/or when the protective cover 11 is opened. Specifically, the switches 8 and 12 do not deliver their detection signals to the controller 47 so long as the glass platen 3 is present and the cover 11 is closed. However, when the glass platen 3 is broken by an accident and/or when the cover 11 is opened for the replacement of the flash lamp 1 and other purposes, the switch 8 applies a detection signal g to the controller 47 and/or the switch 12 applies a detection signal h to the controller 47, steps 1 and 2. Conversely, while none of those detection signals is applied to the controller 47, an ordinary copy mode is set up in which the equipment waits for a copy command, step 3.

When a charge detection signal b is fed to the controller 47 in addition to the signal g and/or the signal h, step 4, the controller 47 delivers a control signal e to the display section 40 and a control signal f to the buzzer 41, step 5. As a result, the display section 40 and the buzzer 41 are actuated in the same manner as previously stated.

Thereafter, the controller 47 produces a relay signal d at a desired timing, step 6, to open the normally closed contact 38 of the relay 37. This turns off the secondary wiring of the trigger transformer 36 and, thereby, prevents a high voltage from being developed in the trigger wire 17 despite any malfunction of the trigger circuit 27.

Then, the controller 47 delivers a control signal i at a suitable timing, step 7, to turn on the photocoupler 42 and, thereby, the thyristor 43. As a result, the charge stored in the main capacitor 26 is dissipated through the windings 39 and 44 and thyristor 43. In this condition, however, the trigger capacitor 28 is not discharged because the resistor 29 has high resistance. To discharge the capacitor 28, the controller 47 applies a trigger signal a, step 8. Specifically, the trigger signal a activates the photocoupler 34 of the trigger circuit 27 to thereby turn on the thyristor 35, whereby the trigger capacitor 28 is successfully discharged.

Further, the controller delivers a relay signal c at a suitable timing to energize the relay 19, i.e., to open its normally close contacts 20. Consequently, the power supply from the power source 18 to the equipment is interrupted.

Figure 7:
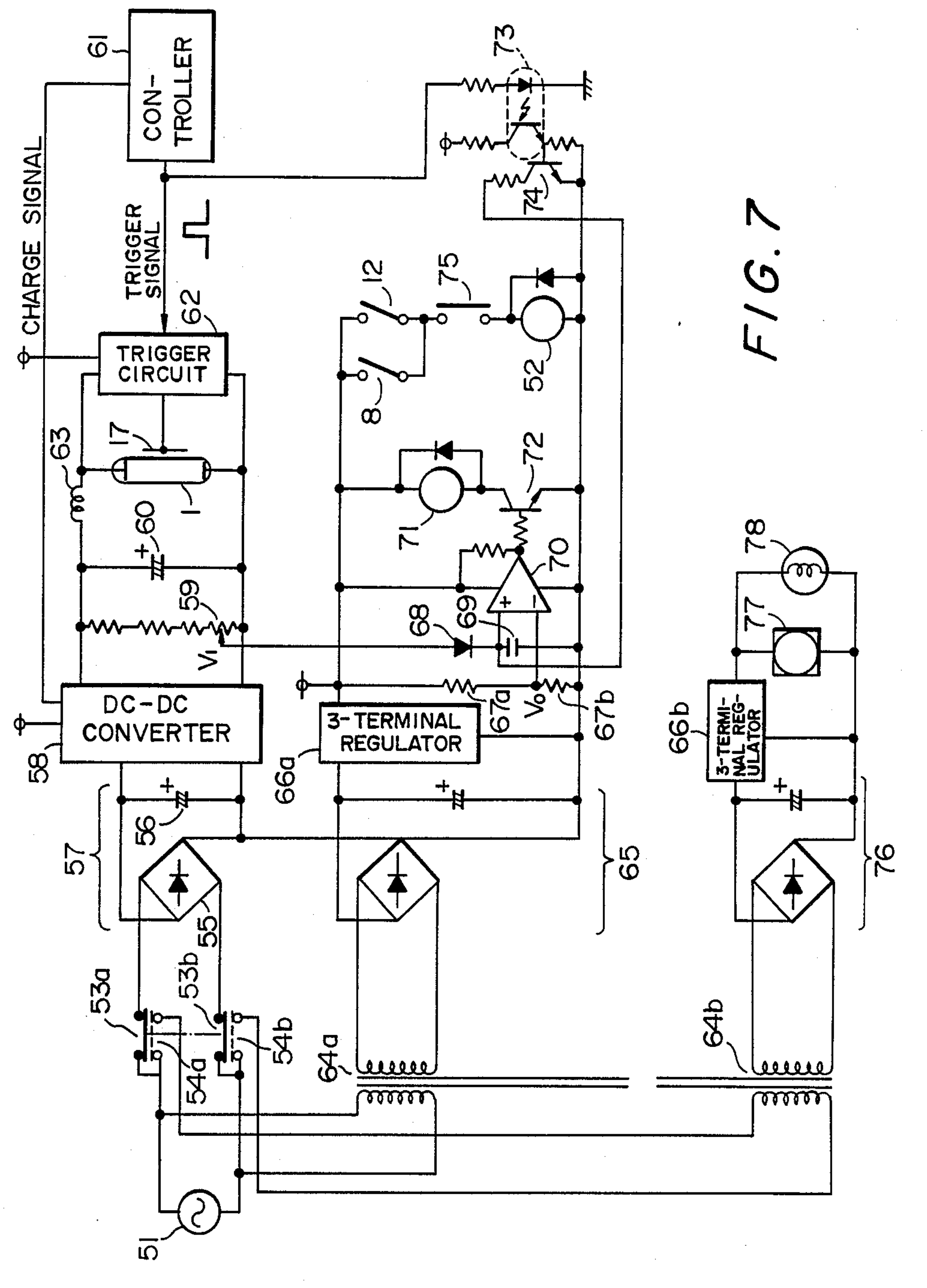
FIG. 7 is a schematic block diagram showing another specific construction of the control circuit in accordance with the present invention.

Referring to FIG. 7, another specific construction of the control circuit is shown. As shown, the control circuit includes a power source 51 for supplying drive energy into the equipment. A relay 52 having normally closed contacts 53*a* and 53*b* and 54*a* and 54*b* is provided for switching the supply of the power source 51 from a charging circuit to an alarming circuit, which will be described, or vice versa. A rectifier and smoother circuit 57 is made up of a rectifier 55 and a capacitor 56 adapted to remove pulsations from an output voltage waveform of the rectifier 55. A DC—DC converter 58 is used as a power converter which converts a DC input voltage into a desired DC voltage. Connected to the DC—DC converter 58 are a resistor 59 for producing a charge detection voltage $V_1$, a main capacitor 60, the flash lamp 1 caused to radiate by the main capacitor 60, and a trigger circuit 62 for triggering the trigger wire 17 in response to a trigger signal from a controller 61, which will be described. A winding 63 is connected between the main capacitor 60 and the lamp 1 in order to control the discharge time of the lamp 1.

A charged voltage detection circuit is constituted by a transformer 64*a* for transforming the power from the power source 51, a rectifier and smoother circuit 65 similar to the previously mentioned rectifier and smoother circuit 57, a threeterminal regulator 66*a*, resistors 67*a* and 67*b* for producing a reference voltage $V_0$, a diode 68 for maintaining the voltage $V_1$ at a peak level, and a capacitor 69. There are further provided a comparator 70 for comparing the reference voltage $V_1$ and the voltage $V_1$, a transistor 72 turned on by the comparator 70 to in turn energize the relay 71, a photocoupler 73 turned on by a trigger signal from the controller 61, a transistor 74 rendered conductive by the photocoupler 73, the switches 8 and 12 connected in parallel with each other, and a normally open contact 75 interposed between the switches 8 and 12 and the relay 52.

The alarming circuit is constituted by a transformer 64*b* for transforming the output of the relay 52, a rectifier and smoother circuit 76 similar to the previously stated ones, and a three-terminal regulator 66*b*. Connected to the rectifier and smoother circuit 76 are a buzzer 77 for producing an audible alarm, and a display section 78 for displaying "DANGER" and "CAUTION".

The operation of the above construction will be described with reference to FIG. 8.

While the glass platen 13 is not broken and the protective cover 11 is not opened, the switches 8 and 12 and, therefore, the relay 52 remains turned off. In this condition, the power source 51 feeds the DC—DC converter 58 via the normally closed contacts 53*a* and 53*b* of the relay 58 and rectifier and smoother circuit 57.

During copying operation, the controller 61 delivers a charge signal to the DC—DC converter 58 so as to charge the main capacitor 60. Thereafter, the controller 61 feeds a trigger signal to activate the trigger circuit 62, whereby the flash lamp 1 emits light due to a discharge which is effected by the trigger wire 17. On the other hand, a DC voltage is applied to the charged voltage detection circuit by way of the transformer 64*a* and three-terminal regulator 66*a*. The resistors 67*a* and 67*b* produce the reference voltage $V_0$, and the resistor 59 produces the charge detection voltage $V_1$ when the main capacitor 60 is charged. The comparator 70 compares the two different voltages V0 and $V_1$ and, if the latter is higher than the former, its output becomes high level to render the transistor 72 conductive and, thereby, energize the relay 71. In this instance, the voltage $V_1$ is held at the peak voltage by the diode 68 and capacior 69. By the trigger signal from the controller 61, the photocoupler 73 is turned on to in turn turn on the transistor 74 resulting that the capacitor 69 is discharged to cancel such a peak hold condition. This makes the output of the comparator 70 low level and the transistor 72 non-conductive, thereby deenergizing the relay 71. In this manner, when the flash lamp 1 is turned on, the relay 71 is repeatedly energized and deenergized. So long as both the switches 8 and 12 are turned off, the relay 52 is not energized even if the normally open contact 75 is closed and opened.

Assume that while the glass platen 3 is broken and/or the protective cover 11 is open, a charge signal is generated due to any malfunction, noise introduced in the controller 61, and others, whereby the main capacitor 60 is charged until the charge detection voltage V1 becomes higher than the reference voltage $V_0$. Then, the relay 71 is energized. At this instance, since the switch 8 and/or the switch 12 has been turned on, the normally open contact 75 of the relay 71 is closed to energize the relay 52. As a result, the normally closed contacts 53*a* and 53*b* of the relay 52 are opened to shut off the power supply to te charging circuit. At the same time, the normally closed contacts 54*a* and 54*b* of the relay 52 are closed to route the power to the transformer 64*b*, so that the buzzer 77 and display section 78 are activated via the recitifer and smoother circuit 76 and three-terminal regulator 66*b*. This alerts the operator to the above-described occurrence.

When the glass platen 3 is broken and/or the protective cover 11 is opened while the main capacitor 60 is charged, the normally open contact 75 of the relay 71 is closed as has been the case with the above-stated situation. Since the switch 8 and/or the switch 12 is turned on, the normally closed contacts 53*a* and 53*b* of the relay 52 are opened to interrupt the power supply to the charging circuit. On the other hand, the normally closed contacts 54*a* and 54*b* of the relay 52 are closed resulting that the power is fed to the transformer 64*b*. Hence, the buzzer 77 and the display section 78 are energized via the rectifier and smoother circuit 76 and three-terminal regulator 66*b*, again alerting the operator to such a condition.

When the buzzer 77 and display section 78 are turned on, the main capacitor 60 undergoes natural discharge. Therefore, the controller may deliver a cancel signal (pulse) to stop the alarm, after a period of time long enough for the discharge has expired. The charged voltage detection circuit and the alarming circuit may each be powered by a lithium cell or like independent power source so as to be prevented from becoming inoperative when a main switch of the equipment is turned off.

Figure 8:
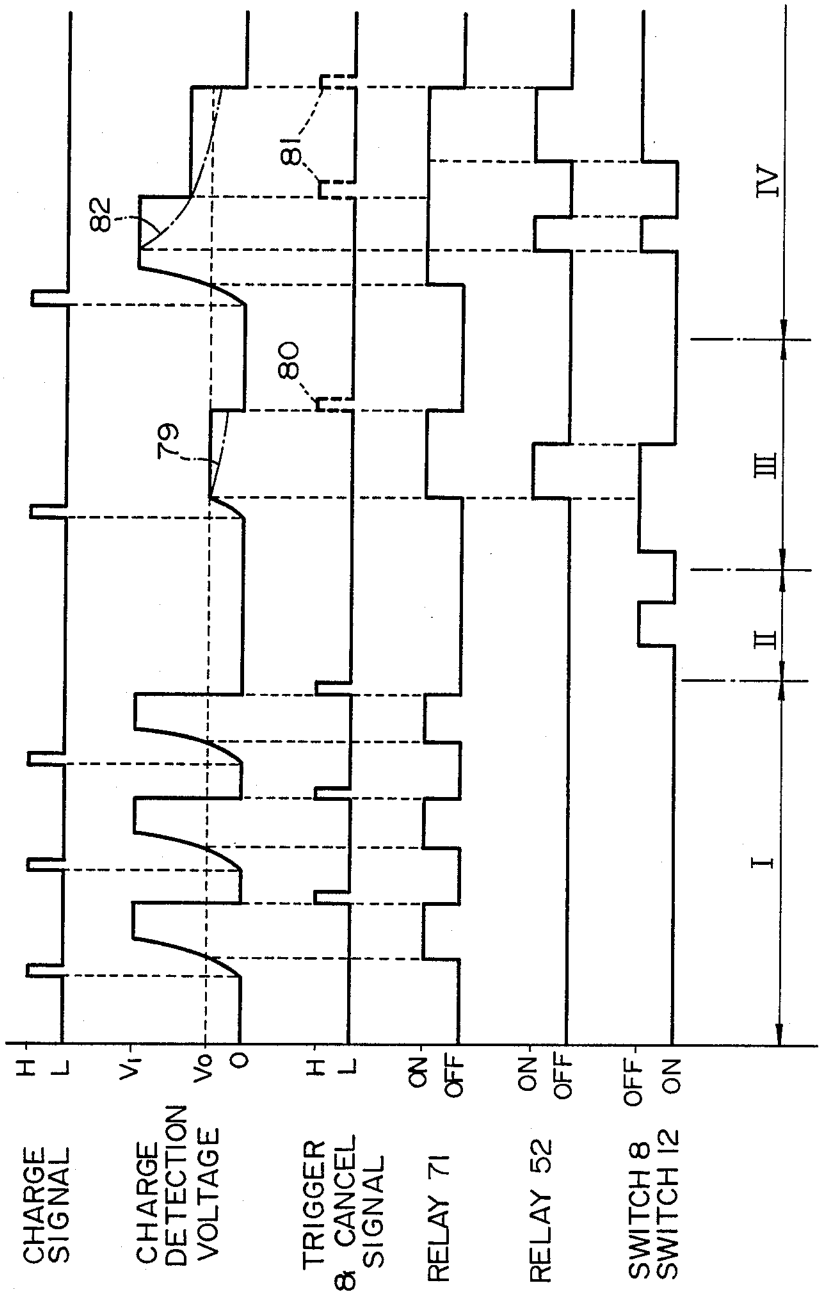
FIG. 8 is a timing chart representative of the operation of the illuminating device of the present invention.

In FIG. 8, a section I is representative of the states of the various portions which occur in an ordinary copy mode. Specifically, charging begins in response to a charge signal, and the flash lamp 1 glows in response to a trigger signal. The relay 71 is energized when the charge detection voltage $V_1$ becomes higher than the reference voltage V0, while being deenergized by a trigger signal from the controller 61. A section II demonstrates that even if the switches 8 and 12 are turned on while the main capacitor 60 is charged, the relay 52 does not operate and, therefore, the alarming circuit remains inoperative. A section III shows the states of the various sections in a condition wherein the charging of the main capacitor 60 has begun while the protective cover 11 is open. Specifically, in the section III, the relays 71 and 52 are energized when the reference voltage is reached after the start of charging. When the switch 8 and/or the switches 12 is turned off, the relay 71 remains energized although the relay 52 is deenergized to cancel the alarm. However, since the charging operation is interrupted upon the energization of the relay 52, the actual charge detection voltage is sequentially lowered due to the natural discharge of the main capacitor 60, as indicated by a dash-and-dots line in the figure. At the instant when the charge detection voltage is checked again by the cancel signal 80 from the controller 61, the voltage $V_1$ has already been lowered beyond the reference voltage $V_0$ and, therefore, the relay 71 is deenergized.

A section IV of FIG. 8 is representative of a situation wherein the glass platen 3 is broken and/or the protective cover 11 is opened, after the charging of the main capacitor 60. Since the relay 71 is energized, the relay 52 is energized simultaneously with the turn-on of the switch 8 and/or that of the switch 12, producing an alarm. Since the actual charge detection voltage V1 is sequentially lowered as indicated by a dash-and-dots line 82 in the figure, the relay 71 is not deenergized even if the controller 61 delivers the cancel signal 81, provided the voltage $V_1$ is higher than the reference voltage $V_0$. It follows that despite the cancel signal 81 the relay 71 is not deenergized unless the capacitor 60 is sufficiently discharged; should the cover 11 or the like be opened in such a condition, the relay 52 would be energized to produce an alarm.

In any of the embodiments and modifications thereof, the switch is located below one corner of the free end 14 of the glass platen 3. Hence, when the glass platene 3 is broken and even if its fragments are left between the fixing member 6 and the upper base member 7, the switch 8 is surely operable because any fragment at the free end portion 14 is not pressed down. Even if a fragment of the glass platen 3 is left pressing the switch 8 as indicated by a dash-and-dots line 15 in FIG. 2 by way of example, the chance for the operator to insert his or her hand toward the broken surface of the remaining fragment because the switch 8 is positioned close to the flash lamp 1. Therefore, locating the switch 8 in the vicinity of the free end 14 of the glass platen 1 is desirable from the safety standpoint.

In summary, it will be seen that the present invention provides an original document illuminating device capable of surely preventing a person from touching a trigger wire and other high-voltage sections which will be exposed to the outside when a protective cover is opened for the replacement of a lamp and other purposes and/or when a glass platen is broken.

What is claimed is:

1. A device for illuminating an original document laid on a glass platen of a recording apparatus to expose a photoconductive element imagewise by using a flash lamp which is triggered by a trigger wire, comprising:
a protective cover for protecting said flash lamp;
a trigger circuit for said trigger wire; and
a control means for disenabling said trigger circuit when the glass platen is broken or when said protective cover is opened.

2. A device as claimed in claim 1, wherein said control means is constructed to trigger said flash lamp by said trigger wire and, thereafter, disenables said trigger circuit.

3. A device for illuminating an original document laid on a glass platen of a recording apparatus to expose a photoconductive element imagewise by using a flash lamp which is triggered by a trigger wire, comprising:
a trigger circuit for said trigger wire;
a breakage sensing means responsive to breakage of the glass platen;
a protective cover for protecting said flash lamp;
a cover position sensing means responsive to an open and a closed position of the protective cover; and
a control means for disenabling said trigger circuit in response to detection by said breakage sensing means and detection by said cover position sensing means.

4. A device as claimed in claim 3, wherein said control means is constructed to trigger said flash lamp by said trigger wire and, thereafter, disenables said trigger circuit.

5. A device for illuminating an original document laid on a glass platen of a recording apparatus to expose a photoconductive element imagewise by using a flash lamp which is triggered by a trigger wire, comprising:
a trigger circuit for said wire;
a breakage sensing means responsive to breakage of the glass platen;
a protective cover for protecting said flash lamp;
a cover position sensing means responsive to an open and a closed position of said protective cover;
a discharging circuit having a capacitor which is charged to a potential for causing said flash lamp to glow, said discharging circuit discharging said capacitor; and
a control means for enabling said discharging circuit in response to detection by said breakage sensing means and detection by said cover position sensing means and, then, disenabling said discharging circuit.

* * * * *